Patented Sept. 4, 1945

2,384,062

UNITED STATES PATENT OFFICE 2,384,062

PROCESS FOR MODIFYING ROSIN

László Auer, South Orange, N. J.

No Drawing. Application October 12, 1942,
Serial No. 461,796

8 Claims. (Cl. 260—106)

GENERAL FIELD OF INVENTION AND STATEMENT OF OBJECTS

This invention relates to treatment of rosin, and especially to treatment with certain modifying agents promoting decarboxylation and/or other changes in characteristics and properties. This application is a continuation-in-part of my copending application Serial No. 318,650, filed February 12, 1940 (now Patent No. 2,298,270).

As is known, gum or wood rosins contain mixtures of rosin acids, known today as abietic acid, pyro-abietic acid and d-pimaric acid amongst others. Such rosins commonly have an acid value of from about 145 to 185, usually from about 160 to about 168, and in their natural state they are ordinarily hard, brittle materials, of melting point from about 70° C. to about 85° C.

Rosin is a valuable raw material for a number of commercial purposes, such as in paper sizing, soap manufacture, and especially in the coatings and plastics industries. There are, in fact, a number of examples in the art of use of various rosin derivatives for purposes such as those mentioned. Some of the most important and common examples occur in the coatings industry, i. e., use of rosin derivatives in paints, varnishes and the like.

In its natural state, however, rosin is not well suited to many commercial purposes for which it is potentially a valuable raw material.

The primary object of the present invention is to modify various physical properties of rosin, whereby to produce modified rosin products which are better adapted to many uses for which rosin or rosin derivatives are now employed. In addition, the modifications brought about in accordance with the present invention make it possible and advantageous to use the modified rosin products for many purposes for which rosin in its natural state and also various derivatives thereof are not well suited.

To illustrate, reference is made to coating compositions, such as varnishes. When employing the modified rosin products produced in accordance with the present invention, the cooking of varnishes (usually containing fatty oil plus resin) is accelerated, and in addition varnishes cooked with modified rosin products produced by the present method have improved drying properties. The modified rosin products may be employed as a part of the film forming ingredients in coating materials.

For certain special purposes in the soap and paper sizing industries, the modified rosin products of this invention may also be of advantage, notwithstanding the fact that the modified products may have a reduced acid value.

One of the important modifications which may be brought about by the process of the invention is the decarboxylation of the rosin. Another important change which may be brought about is in increased aggregation or polymerization, various of the modifications being discussed more fully hereinafter.

In referring to changes of this type and in making comparisons of the modified products with products not treated with modifying agents, it is to be understood that the statements regarding changes and comparisons are always made on the basis of a relation between the product treated with a modifying agent and a product treated in exactly the same manner (heating, etc.) but without a modifying agent. The latter is often herein referred to as a "blank" or "control" experiment.

According to the invention, by appropriate control of treatment conditions, and by appropriate selection of materials, the degree of decarboxylation and/or of other changes in properties including aggregation may be regulated to meet various different requirements.

THE MODIFICATION PROCESS

The process of the invention involves heating the rosin in the presence of a modifying agent of the type mentioned hereinafter, the duration of heating, temperature and other treatment conditions, as more fully explained herebelow, being controlled in accordance with the extent and type of modification desired.

In general, modifying agents employed in accordance with this invention, and also in accordance with certain of my copending applications, identified hereinafter, are polar compounds. The present application is particularly directed to the use of certain oxidizing inorganic acids as modifying agents for rosin, notably nitric acid, and also nitrous acid and the gaseous anhydrides of oxygen containing acids of nitrogen such as $N_2O_5$ and $N_2O_3$.

Because of the volatility of the modifying agent it is usually advisable to add the agent gradually during the reaction, especially when employing higher percentages of the modifying agent.

When treating with volatile gases according to the present invention, it is desirable to bubble the gases through the reaction mass.

In carrying out the process, the rosin is heated between about 100° C. and about 350° C., depending upon other conditions of the process and also upon the degree and nature of modification desired. An advantageous temperature range with most of the agents herein claimed is from about 160° C. to about 300° C.

Anywhere from a trace, for instance, from about .05% to .5%, up to about 10% of the acid may be used, although I have found that in general the percentage should be kept quite low, preferably not above about 5%.

Thorough dispersion of the modifying agent in the rosin is of importance and appropriate control of temperature and time both contribute to bringing about such thorough dispersion. Agitation may be employed as an aid to securing thorough dispersion.

Usually not more than a few hours treatment on temperature will be found sufficient, for instance, from about one hour to about five hours, although in some cases the reaction proceeds very rapidly, requiring not more than about one-half hour.

The process may be carried out under varying conditions of pressure and gas (air or other gas) and with variations of these conditions the properties of the product will be varied, the effects of some of these variations being discussed shortly below. Thus the process may, for instance, be carried out at atmospheric pressure and in the presence of air, or may be carried out in the absence of air, with pressure higher or lower or the same as atmospheric pressure. Since the modifying agent is relatively volatile as above noted, it may be advantageous to conduct the process under a positive pressure, i. e., a pressure higher than atmospheric.

When it is desired to exclude air the reaction may be carried out in a closed vessel, though not necessarily at a positive pressure, so that the gases or fumes of the reaction released from the modifying agent or from the reaction mass serve to exclude the air.

Vacuum is also effective for the purpose of excluding air, and in addition, reduction in contact of air may be brought about by blanketing the surface of the reaction mixture with some inert gas, such as $SO_2$, $CO_2$, or nitrogen. Where vacuum is used, a pressure, for instance, of about 100 mms. Hg to about 450 mms. Hg will be found effective, although higher or lower may be used.

Some more or less general considerations regarding the process should be noted, as follows:

Although the complete mechanism of modification may not be fully understood, it may be mentioned that rosin is an organic isocolloid, i. e., a colloidal system in which the dispersed phase and the dispersion medium are both of the same chemical composition, though present in different physical states.

By modification I believe that the relationship or relative proportions of the dispersed phase and dispersion medium are frequently altered. Quite commonly, when employing modifying agents in accordance with the present application, the melting point of the modified product is raised as compared with a corresponding "blank" experiment. Although some investigators may consider this phenomenon as polymerization, I believe that at least certain changes which take place are of the character of aggregation.

In any event, both polymerization and aggregation are usually accompanied by a decrease in iodine value, and in the event of polymerization, the decrease in iodine value would be explained by chemical change, while in the event of aggregation it would be explained, at least in part, by adsorption phenomena.

Therefore, if the change in physical characteristics and in iodine value is considered as caused by polymerization, there should be a corresponding parallel change in iodine values, while the physical characteristics change. That, however, apparently is not always the case when employing the modifying agents of the present application, as will appear from analysis of examples given hereinafter.

I believe, therefore, that aggregation is probably involved in the reaction. However, as will be seen from examples given below, the aggregation is not necessarily followed by a corresponding increase in melting point, at least to the extent which might be expected. This is apparently explained by the fact that other changes and reactions take place, including decarboxylation, to a greater or lesser degree, depending upon the particular modifying agent selected and also upon other treatment conditions, notably the pressure, temperature and atmospheric condition at the surface of the batch. Decarboxylation is normally accompanied by decrease in acid value, and this effect usually tends to decrease the melting point of the modified product.

In instances where the reaction is carried out below about 250° C., the extent of decarboxylation is commonly lower than where the temperature is somewhat higher.

In general, it appears that the tendency toward softening or liquefaction which accompanies decarboxylation, is usually even more than counteracted by the strong aggregating effect of the acid. However, the melting point represents the differential effect of the two changes just mentioned. The melting point is usually raised to an appreciable extent as compared with corresponding "blank" experiments.

In case of aggregation, change in the size and form of the micelles probably occurs.

In considering the nature of the modifications, it is to be noted that, while some small loss in weight may occur by volatilization (usually not more than about 15–20%), no appreciable fractional or destructive distillation takes place. With appropriate precautions to avoid distillation the process can usually be carried out without loss of more than 5% or 10%, such small loss as does occur usually comprising water, $CO_2$, etc., at least in major part. As a precaution, the temperature should be kept below the boiling or distillation point of the main reaction product, under the applied reaction conditions of the process. By this precaution, destructive distillation or cracking is positively avoided.

The modified rosin product is quite unique, since the rosin molecule retains almost as many carbon atoms as are present in the initial basic constituents of the rosin, the number of carbon atoms being reduced only by that number involved in the decarboxylation.

It is of importance in securing various of the foregoing characteristics that the reaction take place without any appreciable concurrent distillation. In addition, the absence of air and/or control of temperature are important in avoiding destructive distillation.

Whatever the exact nature of the chemical, colloidal and/or physical changes which are brought about, the treatment provided in accordance with the present invention makes possible the changing of the acid value of the modified product, the degree of aggregation, and also the physical consistency of the material. These changes, together with others which usually take place, such as improving film forming properties of the modified products, make possible or practicable use of my modified rosin products for many purposes for which rosin in its natural state is not suited, or at least not well adaptable, and for which many known rosin derivatives are likewise not satisfactory.

By appropriate selection of modifying agent and treatment conditions, such as temperature, time, vacuum, etc., I am enabled to control various physical properties of the modified products.

EXAMPLES

In a table given herebelow, there are reproduced the results of some comparative experiments which were conducted under similar conditions, except for certain designated changes which serve to illustrate differences in properties which may be secured by variations in process.

In all cases the experiments of this comparative series employed nitric acid and in all cases the treatment was conducted on WW wood rosin (Newport Industries), 1,000 gms. of the rosin being heated in a three liter distilling flask. The treatment period was 5 hours. The treatment temperature was maintained fairly close to the figures indicated in the table through the 5 hour treatment period (usually within 10° C. plus or minus).

All temperatures are given in degrees centigrade.

by employment of various different modifying agents. The blank experiments B, C, D, E and F should be compared with various of the numbered experiments conducted at the several temperatures and pressures indicated.

Various of the effects discussed above will be apparent by comparison of iodine values, acid values, melting points, etc., in the foregoing table. The effect of increased decarboxylation usually shows up in those examples conducted at reduced pressure. On the other hand, in general, it will be noted that higher temperatures also tend to increase the extent of decarboxylation.

From the table above it will be seen that the iodine values usually are not decreased to an appreciable extent. The very high iodine value of the product of Example 9 is of particular interest. In this example it will be noted that some reduction in acid value tok place but that the melting point still approximates that of the corresponding "blank" C. Example 9 clearly demonstrates the powerful aggregating effect of the nitric acid.

Acid value and iodine value are both decreased by use of nitric acid. By increasing the percentage of nitric acid, the decrease increases.

The melting points of the products are sometimes higher and sometimes lower than the corresponding blank experiments.

Certain variations in procedure may be adopted.

For example, certain gases, such as $SO_2$, $CO_2$

*Table of comparative experiments*

| Ex. No. | Agent | Temp. | Pres. mms. Hg | Acid value | Iodine value | Melting point |
|---|---|---|---|---|---|---|
| 1 | .5% nitric acid | 290 | 400 | 128.3 | 138.4 | 65.5 |
| 2 | ----do---- | 290 | 760 | 129.6 | 160.5 | 66.5 |
| 3 | ----do---- | 250 | 760 | 152.8 | 187.4 | 81.5 |
| 4 | ----do---- | 200 | 760 | 162.3 | 201.5 | 81.2 |
| 5 | ----do---- | 160 | 760 | 166.9 | 208.0 | 83.5 |
| 6 | 2.5% nitric acid | 250 | 760 | 150.9 | 184.8 | 81 |
| 7 | ----do---- | 200 | 760 | 158.9 | 200.1 | 82 |
| 8 | ----do---- | 160 | 760 | 161.9 | 198.6 | 87 |
| 9 | 5% nitric acid | 290 | 760 | 126.7 | 208.6 | 69 |
| 10 | ----do---- | 200 | 760 | 154.1 | 191.3 | 86 |
| 11 | ----do---- | 160 | 760 | 159.7 | 193.0 | 85 |
| A | (WW wood rosin without any treatment) | | | 169.0 | 206.2 | 81 |
| B | (Heated without agent) | 290 | 400 | 130.3 | 150.8 | 68 |
| C | ----do---- | 290 | 760 | 133.8 | 167.7 | 71.1 |
| D | ----do---- | 250 | 760 | 161.3 | 201.0 | 79.8 |
| E | ----do---- | 200 | 760 | 161.5 | 204.8 | 81 |
| F | ----do---- | 160 | 760 | 164.5 | 206.7 | 85.5 |

All of the products of the above examples were quite solid.

At the bottom of the foregoing table the six examples lettered A, B, C, D, E and F indicate the following:

A=the same WW wood rosin as used in all of the other experiments, so as to indicate the acid value, melting point and consistency of this rosin in its initial untreated state.

B, C, D, E and F=blank experiments carried out under the conditions applied to the other experiments, except that no treating agent was employed during the heating.

In determining melting point, the mercury method was used.

The color of the product may change with the process, although in many cases products of quite light color may be secured, which is of advantage for a number of purposes, such as in varnishes.

The inclusion of items A to F in the above table will facilitate analysis of the effects secured or nitrogen can be either bubbled through the reaction mass or employed as a blanket on the surface of the batch undergoing treatment. Moreover, the reaction vessel may be such that gases evolved from the reaction will effectively exclude air, without either applying vacuum or using other gases. Expedients of this type not only serve to exclude the air from the reaction but may also be utilized for their supplemental effect on the material being treated, this subject being more fully considered in my copending application Serial No. 318,650, filed February 12, 1940, of which the present application is a continuation-in-part. It is here further noted that certain features herein disclosed are also disclosed in my prior U. S. applications Serial No. 386,371, filed April 1, 1941 (now Patent No. 2,311,200); Serial No. 359,425 (now Patent 2,213,944); and Serial No. 143,786 (now Patent 2,189,772).

Moreover, as disclosed in the above mentioned copending applications, still other variations in process may be employed for a number of different purposes, but it is not thought necessary to discuss these fully herein, since reference may be made to the copending applications for that purpose. In passing, however, it is noted that additional treating agents, of a supplemental character, may also be present during the reaction, among which might be mentioned dissolution promoting agents of the type disclosed in my issued Patent No. 2,293,038. Various combinations of modifying agents may also be used for different purposes, including combinations of the modifying agents above disclosed, as well as combinations of the modifying agents herein disclosed with agents disclosed in other of my applications mentioned above as well as hereinafter.

It is further to be noted that in general increasing any one or all of the variables: namely, temperature, time of treatment and percentage of modifying agent, frequently increases the extent of modification, at least in one respect or another. It will be understood that the foregoing is a general rule normally applicable within the ranges of operation above indicated, although, as to at least some variables, there may be limits beyond which the general rule does not apply. For instance, excessive increase in temperature may substantially alter the character of the process as by destructively distilling the product. Increasing the percentage of modifying agent usually increases the degree of aggregation.

In considering the starting material on which the process may be employed, it is first noted that the process brings about changes both of a colloidal and also of a chemical nature. It is important, however, to bear in mind that the process essentially involves a reaction with the rosin molecule, that is, with the type of molecules of which the basic constituents of natural rosin are composed. Therefore, while rosin itself, such as gum or wood rosins, represents perhaps the most important starting material to which the process is adaptable, it is noted that the process may be employed on rosin which has been pretreated in various ways, or on mixed or chemically condensed materials incorporating rosin, since the reaction will take place wherever the rosin molecule is present provided, of course, that the physical or chemical state or "environment" of the rosin molecule is not such as to prevent the reaction from taking place. From the above it will be seen that rosin esters may be treated by the process.

It may also be mentioned that there are other natural resins, such as copals, which act similarly to rosin by treatment in accordance with this invention. In fact, the reaction may be carried out on any of the natural resins containing high molecular resin acids. Therefore, wherever any such other natural resin behaves similarly to rosin, it is herein considered as an equivalent.

Copals are fossil gums which have to be "fused" before becoming soluble in organic solvents and miscible with fatty oil. When copals are used in the present process, they should be employed in the fused state.

The modified product of this invention may if desired, be subject to other treatment, depending upon the use for which it is intended. Thus, for example, the modified products may be vulcanized with sulphur. The modified resin products secured in accordance with the foregoing, may be vulcanized as such, or in solutions, such as varnish solutions (in the latter case with sulphur chloride).

Further, they may be converted into emulsions and used for various purposes in that form.

In the event sulphur or other sulphur-like vulcanizing agents are used, vulcanization, for certain purposes, is desirably carried out at temperatures between about 120° C. and 200° C. For other purposes where vulcanization is to be effected at lower temperatures, for instance, at room temperature, sulphur chloride, or similarly acting vulcanizing agents, should be used. In instances where the vulcanization is carried out in a varnish solution, the sulphur chloride treatment is especially practical.

As is mentioned in my copending application Serial No. 386,371, filed April 1, 1941, the modified rosin products may be subject to still other supplemental treatments, such for instance as esterification, as by treating with glycerin or other polyhydric alcohols, such as glycols, pentaerythritol, mannitol, sorbitol, etc.

The vulcanized resin products made in accordance with the invention have valuable properties for a number of purposes including the making of protective coatings, such as lacquers.

The products produced in accordance with this invention are useful in making rosin modified maleic and rosin modified phenolic resins.

I claim:

1. A process for modifying the properties of rosin which process comprises incorporation in the rosin up to 10% of an oxygen containing inorganic acid of nitrogen, and heating the mixture out of contact with the atmosphere between about 160° C. and 350° C., but not above the temperature at which appreciable destructive distillation of the rosin occurs under the conditions of the treatment, said heating to last at least about one-half hour and not more than about five hours, the resulting modified rosin being in a solid resinous state at room temperature, having a melting point not lower than 65.5° C., as determined by the mercury method.

2. A process in accordance with claim 1 in which the treatment temperature is such that the melting point of the modified rosin product is not substantially below the melting point of the same rosin heated to the same temperature under the same conditions but without a modifying agent.

3. A process in accordance with claim 1 in which the reaction is carried out at atmospheric pressure.

4. A process in accordance with claim 1 in which the reaction is carried out under vacuum.

5. A process in accordance with claim 1 in which the acid is nitric acid.

6. A process in accordance with claim 1 in which the treatment is carried out at a pressure higher than atmospheric pressure.

7. A process for modifying the properties of rosin, which process comprises heating the rosin out of contact with the atmosphere with from about 0.5% to about 5% of nitric acid at a temperature between about 200° C. and about 350° C., but not above the temperature at which appreciable destructive distillation of the rosin occurs under the conditions of the treatment, said heating to last at least about one-half hour and not more than about five hours, the resulting modified rosin being in a solid resinous state at room temperature, having a melting point not lower than 65.5° C., as determined by the mercury method.

8. A process in accordance with claim 7 in which the heating is effected under reduced pressure.

LÀSZLÓ AUER.